(12) United States Patent
Rode

(10) Patent No.: US 8,490,524 B2
(45) Date of Patent: Jul. 23, 2013

(54) SYSTEMS AND METHODS FOR ADJUSTING BEARING ENDPLAY

(76) Inventor: John E. Rode, Fonda, NY (US)

(*) Notice: Subject to any disclaimer, the term of this patent is extended or adjusted under 35 U.S.C. 154(b) by 0 days.

(21) Appl. No.: 13/019,583

(22) Filed: Feb. 2, 2011

(65) Prior Publication Data

US 2012/0079922 A1 Apr. 5, 2012

Related U.S. Application Data

(60) Provisional application No. 61/388,806, filed on Oct. 1, 2010.

(51) Int. Cl.
*B25B 13/48* (2006.01)

(52) U.S. Cl.
USPC ............... 81/462; 33/517; 141/98; 81/124.3; 81/94

(58) Field of Classification Search
USPC ............ 81/462, 121.1, 124.4, 176.1, 176.15, 81/176.2, 177.2, 124.3, 177.5; 7/100, 138, 7/166
See application file for complete search history.

(56) References Cited

U.S. PATENT DOCUMENTS

| | | | | |
|---|---|---|---|---|
| 518,328 A | * | 4/1894 | Oakey | ................................. 7/138 |
| 578,576 A | | 3/1897 | Strauss et al. | |
| 1,352,643 A | | 9/1920 | Young | |
| 1,366,273 A | | 1/1921 | Nettlefold | |
| 1,373,489 A | | 4/1921 | Cochran | |
| 1,384,655 A | * | 7/1921 | Allmon | ........................ 81/124.3 |
| 1,440,938 A | | 1/1923 | Sieroslawski | |
| 1,755,807 A | | 4/1930 | Boles | |
| 1,758,515 A | | 5/1930 | Heiermann | |
| 2,301,786 A | | 11/1942 | Millermaster | |
| 2,426,219 A | | 8/1947 | Jackson | |
| 2,755,698 A | | 7/1956 | Wurzel | |

(Continued)

FOREIGN PATENT DOCUMENTS

| | | |
|---|---|---|
| DE | 3905385 | 8/1990 |
| EP | 1367299 A2 | 12/2003 |

(Continued)

OTHER PUBLICATIONS

"STEMCO Pro-Torq Advanced Axle Spindle Nuts 09-571-0006", Instructions Guide, Copyright Aug. 2003, 2 pages.

(Continued)

*Primary Examiner* — Monica Carter
*Assistant Examiner* — Melanie Alexander
(74) *Attorney, Agent, or Firm* — Heslin Rothenberg Farley & Mesiti P.C.; Victor A. Cardona, Esq.

(57) ABSTRACT

An apparatus for use in adjusting an endplay of a bearing of a wheel hub assembly includes an outer circumferential surface configured to be received within an annular space around the nut attached to a shaft of the wheel hub assembly and retaining the bearing on the shaft. An engaging surface is coupled to the outer circumferential surface and configured to engage the nut. A stopping surface is coupled to the engaging surface and configured to abut an outer surface of the nut opposite the bearing such that the engaging surface is positioned in an engaging position to engage nut engaging surfaces of the nut. An arm is connected to the stopping surface and extends out of the annular space away from the bearing and substantially parallel to an axis of the shaft when the stopping surface abuts the outer surface of the nut.

16 Claims, 6 Drawing Sheets

U.S. PATENT DOCUMENTS

| | | | | |
|---|---|---|---|---|
| 2,769,360 | A * | 11/1956 | Cottrell et al. | ............... 81/124.3 |
| 2,813,732 | A | 11/1957 | Hird | |
| 3,144,909 | A | 8/1964 | Hart et al. | |
| 3,241,409 | A * | 3/1966 | Raptis | ............... 81/94 |
| 3,464,474 | A | 9/1969 | Jansen | |
| 3,480,300 | A | 11/1969 | Jeffery et al. | |
| 3,581,609 | A | 6/1971 | Greenwood | |
| 3,664,226 | A * | 5/1972 | Gonzalez | ............... 411/2 |
| 3,678,981 | A | 7/1972 | Heyworth | |
| 3,742,568 | A | 7/1973 | Hahlbeck | |
| 3,762,455 | A | 10/1973 | Anderson, Jr. | |
| 3,844,323 | A | 10/1974 | Anderson, Jr. | |
| 3,986,750 | A | 10/1976 | Trent et al. | |
| 4,048,897 | A | 9/1977 | Price, Jr. | |
| 4,054,999 | A | 10/1977 | Harbottle | |
| 4,210,372 | A | 7/1980 | McGee | |
| 4,305,438 | A * | 12/1981 | Spinosa et al. | ............... 141/98 |
| 4,812,094 | A | 3/1989 | Grube | |
| 4,958,941 | A | 9/1990 | Imanari | |
| 4,971,501 | A | 11/1990 | Chavez | |
| 5,011,306 | A | 4/1991 | Martinie | |
| 5,058,424 | A | 10/1991 | O'Hara | |
| 5,070,621 | A * | 12/1991 | Butler et al. | ............... 33/517 |
| 5,129,156 | A | 7/1992 | Walker | |
| 5,180,265 | A | 1/1993 | Wiese | |
| 5,348,349 | A | 9/1994 | Sloane | |
| 5,362,111 | A | 11/1994 | Harbin | |
| 5,366,300 | A | 11/1994 | Deane | |
| 5,533,849 | A | 7/1996 | Burdick | |
| 5,535,517 | A | 7/1996 | Rode | |
| 5,597,058 | A | 1/1997 | Ewer | |
| 5,877,433 | A | 3/1999 | Matsuzaki et al. | |
| 5,882,044 | A | 3/1999 | Sloane | |
| 6,058,767 | A | 5/2000 | Calvin | |
| 6,065,920 | A | 5/2000 | Becker et al. | |
| 6,186,032 | B1 * | 2/2001 | Raines | ............... 81/119 |
| 6,286,374 | B1 | 9/2001 | Kudo et al. | |
| 6,520,710 | B2 | 2/2003 | Wells | |
| 6,598,500 | B1 * | 7/2003 | Chivington | ............... 81/55 |
| 6,637,297 | B1 * | 10/2003 | Mlynarczyk | ............... 81/124.3 |
| 6,749,386 | B2 | 6/2004 | Harris | |
| 6,857,665 | B2 | 2/2005 | Vyse et al. | |
| 6,976,817 | B1 | 12/2005 | Grainger | |
| 6,993,852 | B2 | 2/2006 | Russell et al. | |
| 7,303,367 | B2 | 12/2007 | Rode | |
| 7,343,836 | B1 * | 3/2008 | Ward | ............... 81/177.7 |
| 7,346,985 | B1 | 3/2008 | Strait | |
| 7,389,579 | B2 | 6/2008 | Rode | |
| 7,428,779 | B2 | 9/2008 | Smith et al. | |
| 2002/0110414 | A1 | 8/2002 | Wells | |
| 2003/0035699 | A1 | 2/2003 | Harris | |
| 2004/0086354 | A1 | 5/2004 | Harris | |
| 2004/0089113 | A1 * | 5/2004 | Morgan | ............... 81/124.3 |
| 2005/0025604 | A1 | 2/2005 | Slesinski et al. | |
| 2005/0207865 | A1 | 9/2005 | Disantis et al. | |
| 2006/0008340 | A1 | 1/2006 | Cox | |
| 2007/0177829 | A1 | 8/2007 | Rode | |
| 2007/0211973 | A1 | 9/2007 | Rode | |
| 2007/0286699 | A1 | 12/2007 | Rode | |
| 2010/0326205 | A1 | 12/2010 | Rode | |

FOREIGN PATENT DOCUMENTS

| | | |
|---|---|---|
| GB | 2286231 A | 8/1995 |
| GB | 2434621 B | 8/2007 |
| GB | 2435499 B | 8/2007 |

OTHER PUBLICATIONS

"STEMCO Pro-Torq 571-2970", Copyright 2005, STEMCO LP, 2 pages.

"Timken Products-Bearings", vol. 1, Issue 6, 2 pages. http://www.timken.com/products/bearings/techtips/tip6.asp.

Timken Tech Tips: Promoting Safe, Proper Bearing Handling Practices for the Heavy Duty Market, "Preload in Wheel Bearings", vol. 6, Issue 3, 2 pages. http://www.Timken.com/products/bearings/techtips/PDFs/Vol6No3.pdf#search='Bearing%20Preload'.

"Forming and Shaping Processes Compaction and Sintering (Pulvepresning)," Copyright Institut Precesteknik Danmarks Tekniske Univeresitet 1996. http://www.ipt.dtu.dk/~ap/ingpro/fprming/ppm/htm.

"STEMCO, Pro-Torq, An Axle Spindle Nut System for Today's Fleets", Mar. 2003. http://www.stemco.com, pp. 38-41.

"STEMCO. Pro-Torq, An Axle Spindle Nut System for Today's Fleets", Mar. 2003. http://www.stemco.com, pp. 57-64.

"What is Powder Metallurgy?". Dec. 2004, 2 pages. https://www.mpif.org/technology/whatis.htm.

Aug. 25, 2010 GB Intellectual Property Office Search Report under Section 17 in related Application No. GB 1008927.4.

* cited by examiner

SYSTEMS AND METHODS FOR ADJUSTING BEARING ENDPLAY

CROSS-REFERENCE TO RELATED APPLICATIONS

This application relates to U.S. application Ser. No. 12/951,727, filed Nov. 22, 2010, titled "Systems and Methods for Measuring Bearing Endplay", U.S. application Ser. No. 12/492,826, filed Jun. 26, 2009, titled "Systems And Methods For Preloading A Bearing And Aligning A Lock Nut", U.S. application Ser. No. 11/341,948, filed Jan. 27, 2006, and titled "Method And Apparatus For Preloading A Bearing," published as U.S. Publication No. US2007/0177829A1 on Aug. 2, 2007, U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, and U.S. Provisional Application No. 61/388,806, filed Oct. 1, 2010, and titled "Systems and Methods for Preloading a Bearing and Aligning Lock Nut", each of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new. Further, a variability in drag when turning the adjusting nut is often encountered due to imperfections in the axle thread.

In one example, a user may tighten a nut holding a bearing on a shaft to a particular torque and then such nut may be loosened to a particular position by referencing an index mark on a face of the nut a particular distance. Such a nut could be turned a particular portion of a rotation by referencing such a marking, e.g., half a turn. Such an adjustment is a particularly inexact procedure given that wheel nut adjustment is desired to have precision of 0.001 of an inch while the degree of rotation of a nut as described is relatively inexact.

Lock nut systems using a single nut are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

Thus, a need exists for providing accurate and repeatable procedures and devices for providing and adjusting bearing preload and for adjusting lock nut systems configured to retain preloaded bearings.

SUMMARY OF THE INVENTION

The present provides, in a first aspect, an apparatus for use in adjusting an endplay of a bearing of a wheel hub assembly which includes an outer circumferential surface configured to be received within an annular space around a nut attached to a shaft of the wheel hub assembly and retaining the bearing on the shaft. An engaging surface is coupled to the outer circumferential surface and configured to engage the nut. A stopping surface is coupled to the engaging surface and configured to abut an outer surface of the nut opposite the bearing such that the engaging surface is positioned in an engaging position to engage nut engaging surfaces of the nut. An arm is connected to the stopping surface and extends out of the annular space away from the bearing and substantially parallel to an axis of the shaft when the stopping surface abuts the outer surface of the nut. The arm includes a drive connecting portion at an end of the arm opposite the stopping surface. The drive connecting portion is configured to connect to a drive to allow a user to manipulate the arm and the engaging surface to turn the nut to adjust an endplay of the bearing.

The present invention provides, in a second aspect, a system for use in adjusting an endplay of the bearing of a wheel hub assembly which includes an adjustment tool received in an annular space around a nut attached to a shaft of the wheel hub assembly and retaining the bearing on the shaft. The tool has an engaging surface releasably engaging the nut. The tool has a stopping surface releasably abutting an outer surface of the nut opposite the bearing such that the engaging surface is positioned in an engaging position engaging nut engaging surfaces of the nut. The tool has an arm extending away from the bearing and substantially parallel to an axis of the shaft. The arm extends away from the bearing such that an end of the arm opposite the bearing is accessible to a user to allow the user to turn the arm and the engaging surface to turn the nut to adjust an endplay of the bearing.

The present invention provides, in a third aspect, a method for use in adjusting an endplay of a bearing of a wheel hub assembly which includes receiving an adjustment tool in an annular space around a nut attached to a shaft of the wheel hub assembly and retaining the bearing on the shaft. The tool has an engaging surface releasably engaging the nut. The tool has a stopping surface releasably abutting an outer surface of the nut opposite the bearing such that the engaging surface is positioned in an engaging position engaging nut engaging surfaces of the nut. The tool has an arm extending away from the bearing and substantially parallel to an axis of the shaft. The arm extends away from the bearing such that an end of the arm opposite the bearing is accessible to a user to allow the user to turn the arm and the engaging surface to turn the nut to adjust an endplay of the bearing.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Figure 1:
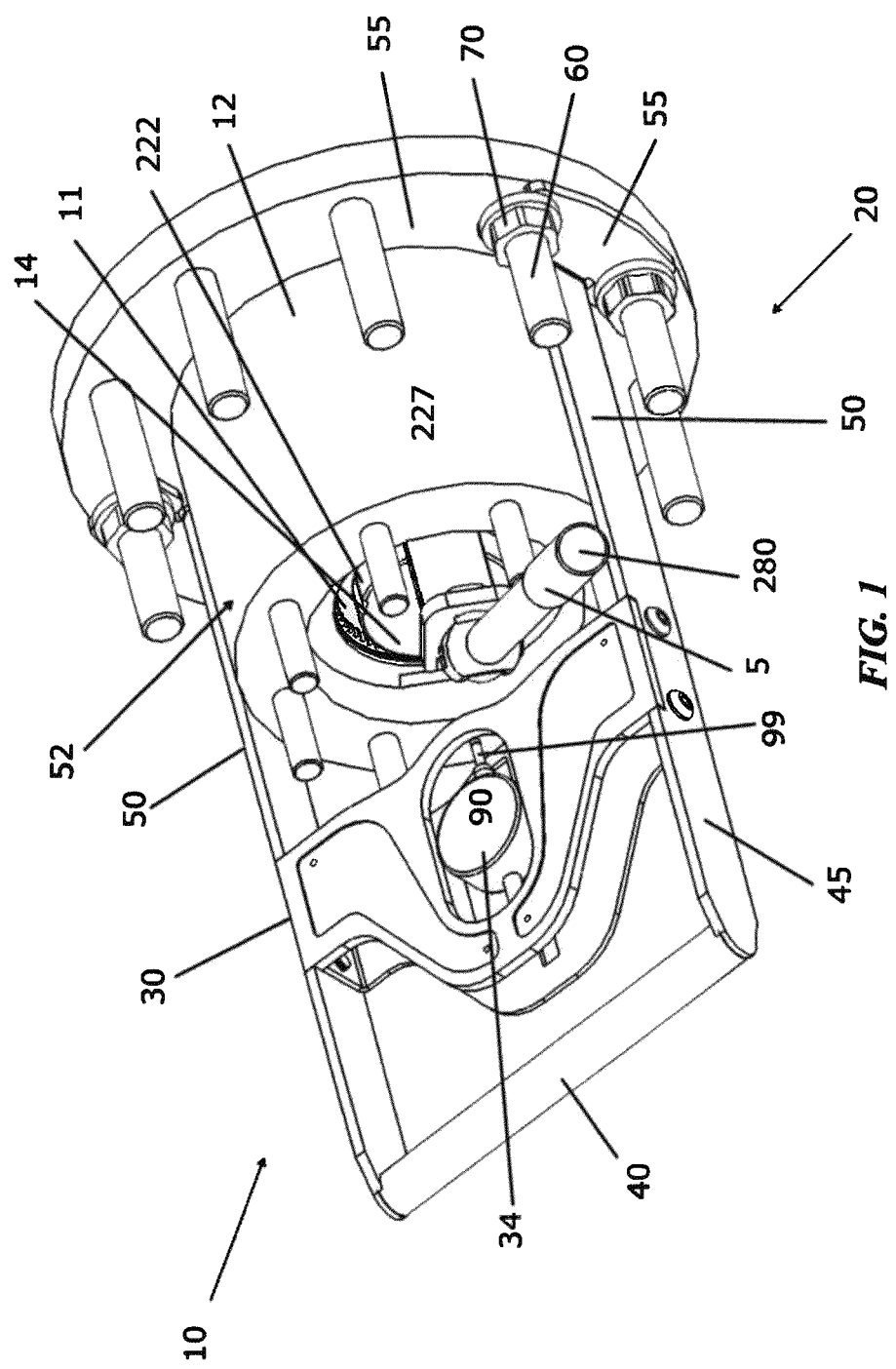
FIG. 1 is perspective view of a system for adjusting endplay on a bearing of a wheel hub assembly mounted on a shaft in accordance with the present invention.

In accordance with the principals of the present invention, systems and methods for adjusting bearings mounted on a shaft are provided. In an exemplary embodiment depicted in FIGS. 1-4, a system 10 for measuring end play is mounted on a wheel hub assembly 20. System 10 is also described in co-owned application Ser. No. 12/951,727 incorporated by reference above. As depicted herein for simplification purposes, system 10 lacks a spindle adapter or cap threaded onto an end 13 of a shaft 14 but such a cap is more correctly depicted in the indicated co-owned application.

Wheel hub assembly 20 is an assembly that may typically be found on a rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, system 10 may be used in these and any other assembly for which bearing preload and/or endplay is desired, for example, any assembly that utilizes thrust and radial load carrying bearings that are indirectly mounted.

As shown in FIGS. 1-4, for example, wheel hub assembly 20 includes a wheel hub or, simply, a hub 12, a threaded, spindle, axle, or a shaft 14. As is typical, shaft 14 is mounted on two antifriction bearings and shaft 14 includes an exposed end 13, which is typically threaded on the outside diameter and is partially hollow at the end. A retaining nut 11 may be threaded to exposed end 13 to retain hub 12 thereon.

Figure 4:
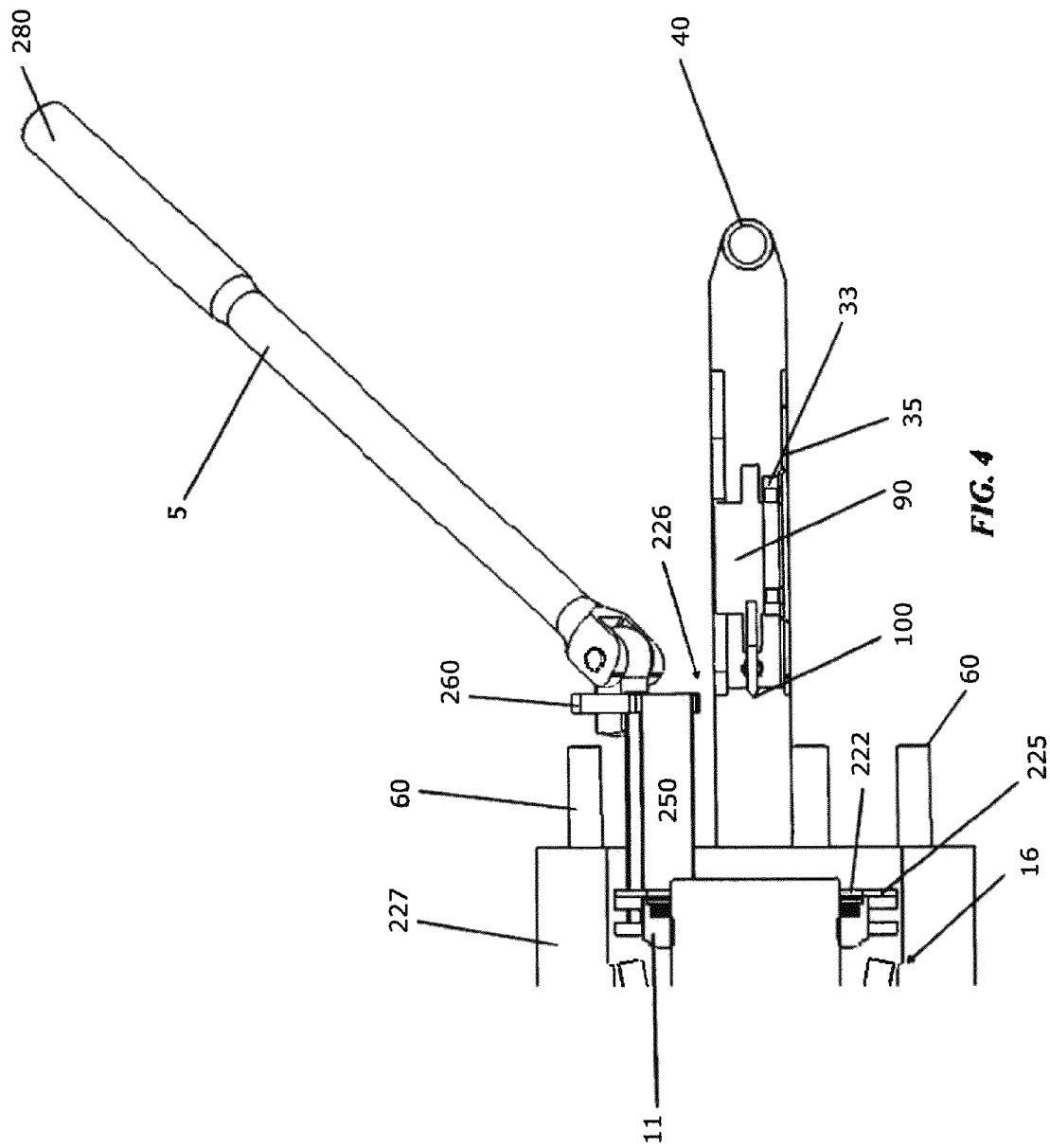
FIG. 4 is a side cross-sectional view of a portion of the system of FIG. 1.

As shown in FIG. 4, as is typical of bearings, outboard bearing 16 includes an inner race (or cone) (not shown), an outer race (or cup) (not shown), a plurality of rollers (not shown), and a roller cage (not shown). Similarly, an inboard bearing (not shown) includes an inner race (or cone) (not shown), an outer race (or cup) (not shown), a plurality of rollers (not shown), and roller cage (not shown). The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389, 579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 5-8 of co-owned U.S. Provisional Application No. 61/388,806, filed Oct. 1, 2010, entitled "Systems and Methods for Preloading a Bearing and Aligning Lock Nut", for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (Application No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In another example, a retaining nut could be a locking nut as disclosed in U.S. Pat. No. 3,762,455 to Anderson Jr. In the conventional art, retaining nut 11 typically is used to secure a wheel (e.g., wheel 200, FIG. 3) or hub assembly to non-rotating axle or spindle 14. However, in aspects of the present invention, retaining nut 11 may be useful in varying the preload and/or endplay of bearing 16. Bearing 16 may be a tapered roller bearing, or aspects of the invention may be applied to other types of antifriction bearings for which it is desirable to provide preload and/or endplay, for example, spherical roller bearings, deep groove ball bearings, and the like.

As described above, it is desirable for an adjustment to be provided to a bearing assembly such that a desired amount of endplay is present. After retaining nut 11 is tightened on the shaft to a particular predetermined torque (e.g., using a torque wrench), the standard procedures call for a loosening of about ¼ turn to create a desirable endplay of bearing 16 on shaft 14. All typical adjustment procedures require that said endplay be measured with a dial indicator to assure a safe adjustment had been achieved.

System 10 may include a frame 30 formed of the plurality of cross members 35. Frame 30 may be connected to a handle 40 at one end of system 10 by connecting legs 45. Frame 30 may also be connected to pressing legs 50 which may extend from frame 30 away from handle 40 and to wheel hub 12 as depicted in the figures. Pressing legs 50 may be connected to wheel hub 12 at wheel lugs 60. Connecting tabs 55 may be connected to, or monolithic relative to, pressing legs 50 and may be aligned in a direction substantially perpendicular to pressing legs 50, such that connecting tabs 55 may be received under lug nuts 70 threaded onto wheel lugs 60. Pressing legs 50 may be substantially parallel to each other and may be connected to wheel hub 12 such that the legs are substantially parallel to the axis (i.e., longitudinal axis) of shaft 14. Connecting legs 45 may also be substantially parallel to the axis of shaft 14. Each connecting leg and pressing leg on a same side of frame 30 may be monolithic to, or connected to, one another. The cross members (i.e., cross members 35) may be connected on each side thereof to at least one of pressing legs 50 and connecting legs 45.

A spindle adapter or cap (not shown herein, but depicted in co-owned application Ser. No. 12/951,727, may be threaded onto end 13 of shaft 14 such that the cap is tightened to a particular torque, for example. The cap may include a wrenching surface to allow such tightening. As used herein, cap refers to any structure, or part of a structure, which is affixed to the threaded end 13 of shaft 14. A dial indicator or probe 90 may be received in a cavity of frame 30 such that probe 90 is stationary relative to frame 30 and a remainder of system 10. For example, probe 90 may be connected to cross members 35 in any number of ways, such as by welding or by mechanical fasteners. Frame 30 may include an opening to allow user to view a display 34 of a dial indicator of probe 90.

A probe tip 100 of a probe stem 99 may contact a cap (e.g., an axially projecting portion) (not shown herein for purposes of simplification) when the cap is threaded onto shaft 14. Probe tip 100 may be aligned in a direction substantially parallel to an axis of shaft 14. For example, an axis of probe tip 100 may be substantially aligned with the longitudinal axis of shaft 14.

When a measurement of endplay of hub assembly 20, including wheel hub 12 and bearing 16, is desired, a user may grasp handle 40 and push in a first direction toward hub 12 until no further forward motion occurs. Probe 90 may then be reset to a known setting (e.g., 'zeroed') to allow a measurement by probe 90 which it is in contact with the cap attached to shaft 14. The user may then pull in a second direction on handle 40 until no further reverse motion of hub 12 occurs. The user may then view display 34 to determine a measurement of the movement of hub 12 relative to the cap as determined by the movement of probe 90 which is in contact with the face of the cap. The movement by the probe signals a distance on the display which indicates the endplay of wheel hub 12 and bearing 16. The difference between a movement after forward motion of the hub ceases to that after reverse motion of the hub ceases provides an indication of the endplay of bearing 16. The components of system 10 (e.g., the connecting legs, extending legs, handle, tabs, and frame) may be sufficiently rigid to allow the application of a force (e.g., in a forward and reverse axial direction relative to shaft 14) to handle 40 to transfer such force to hub 12 to allow the motion of hub 12 in a forward and reverse direction to allow the measurement of the endplay as described.

Further, as described above probe 90 is connected to frame 30. The connection of probe 90 to frame 30 may be fixed as described above or could be adjustable. For example, probe 90 may be connected to a plate 33 which has screws or other connectors received in slots of frame 35 such that probe 90 may be adjusted to a particular position and tightened by the screws or fasteners to frame 35 if further adjustment is desired other than the use of the cap extender described above.

After the measurement of endplay described above (or prior thereto) it may be desirable to tighten nut 11 to adjust such endplay. As depicted in FIG. 1, openings 52 may be present between connecting legs 50 on opposite sides of system 10. A user may insert a wrench 5 into one of openings 52 to engage the wrench with a nut 11 to adjust an endplay of bearing 16 and hub 12.

Figure 5:
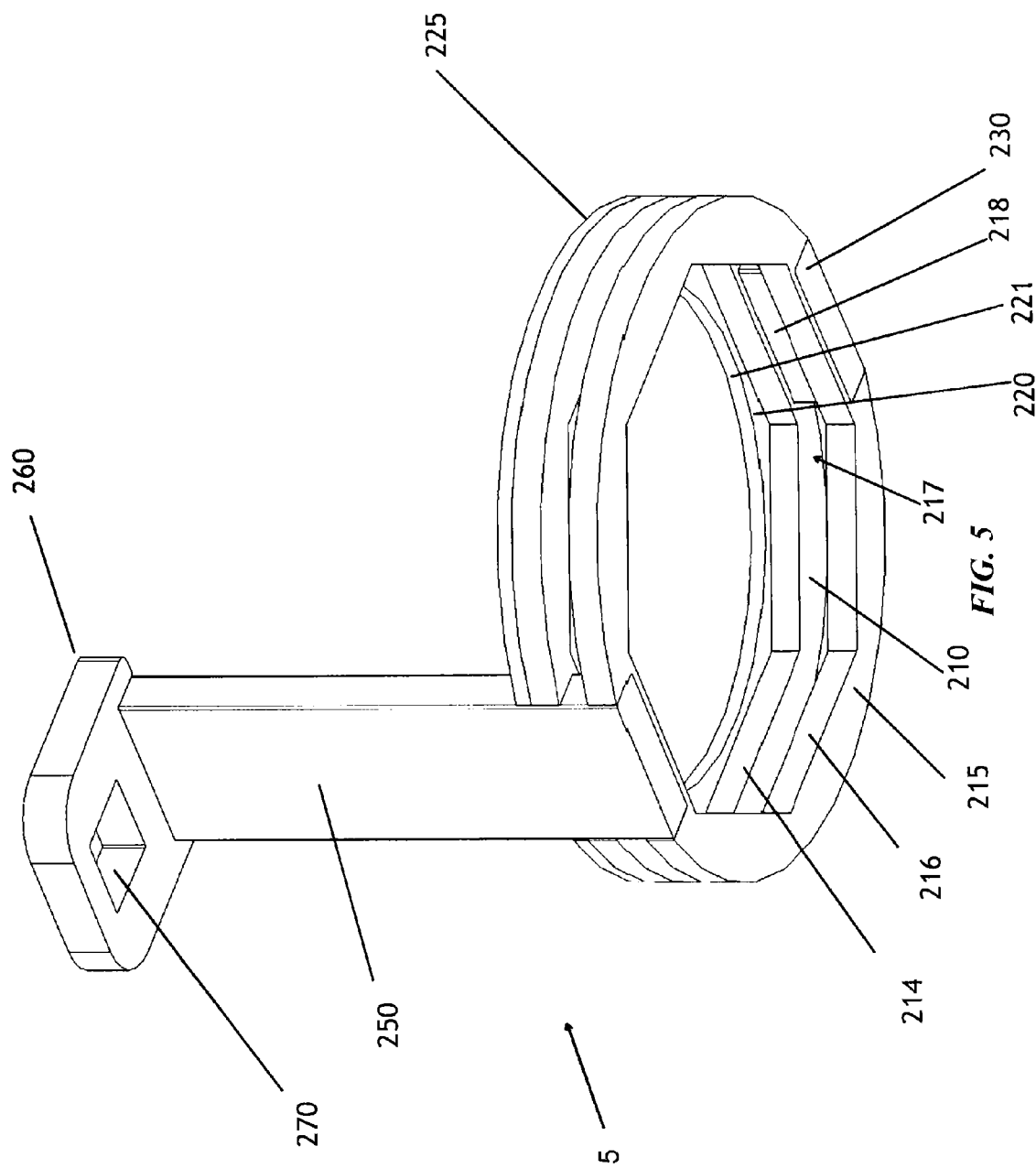
FIG. 5 is a bottom perspective view of a wrench as depicted in the system of FIG. 1.
Figure 6:
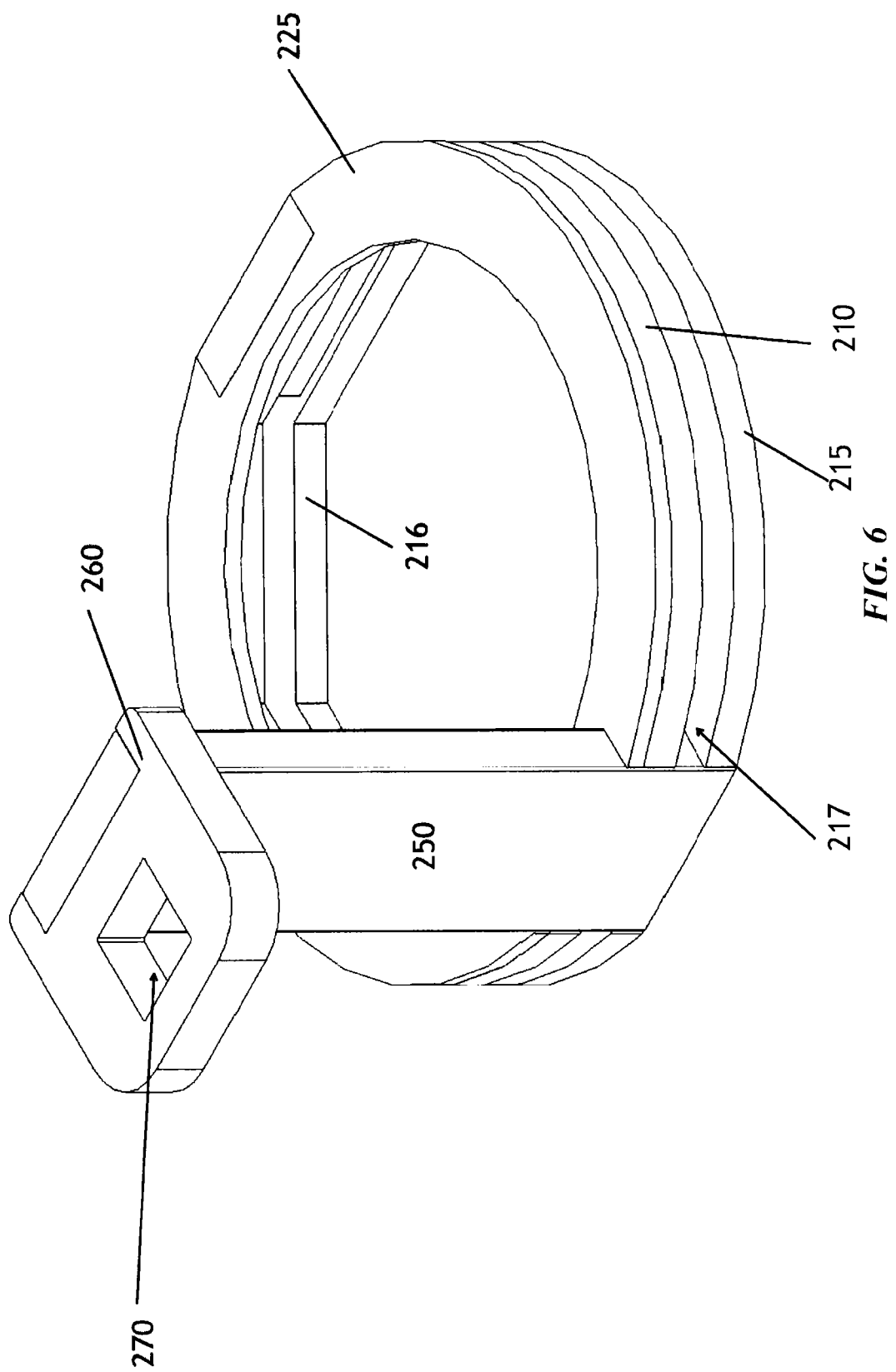
FIG. 6 is a top perspective view of the wrench of FIG. 5.

As depicted in. FIGS. 5-6, wrench 5 may include a first nut engaging member 210 and a second nut engaging member 215 having inner engaging surfaces 214 and 216, respectively, configured (e.g., shaped and dimensioned) to engage nut flat portions on an exterior surface of nut 11 such that wrench 5 may turn nut 11 when manipulated by a user, Although two nut engaging members are depicted, one nut engaging member or more than two nut engaging members could also be utilized, Such nut engaging members may be co-axially positioned relative to each other and axially spaced (when engaging nut 11) from one another relative to an axis of a shaft of a bearing assembly by an opening 217 and a spacer 218 as depicted in the figures, for example. Inner surfaces 214 and 216 of engaging members 210 and 215 may be configured (e.g., shaped and dimensioned) as a closed wrench (i.e., designed to be placed over a top of a nut) sized substantially equally to an outer surface of nut 11such that the inner surfaces may engage and manipulate nut 11.

A stopping surface 220 may be present on a bottom side of a top member 225. The stopping surface may abut a top surface 222 of nut 11 when wrench 5 is received in a cavity or annular circumferential space 226 around nut 11. Top member 225 may also have an inner circumferential surface 221 having an axis aligned with an axis equidistant from engaging surfaces 214 and/or 216 of engaging members 210 and/or 215. The axis of inner circumferential surface 221 and engaging surfaces 214 and 216 may be aligned with an axis of shaft 14 when wrench 5 is received in annular space 226 and engaging portions 214 and 216 engage nut 11.

As depicted in FIGS. 5 and 6, stopping surface 220 is coupled to engaging surfaces 214 and 216 of engaging members 210 and 215, such that by receiving stopping surface 220 on top surface 222 of nut 11 the engaging surfaces are positioned in a fixed axial position relative to the axis of the shaft. This positioning of stopping surface 220 on top surface 222 thus causes the engaging surfaces to be in a desired place (e.g., axially relative to shaft 14) adjacent nut 11 to allow wrench 5 to manipulate nut 11, along with avoiding a bottom side 230 of wrench 5 extending too far axially into annular space 226. By avoiding wrench 5 from extending too far into this space, any contact between wrench 5 and the outer bearing of the bearing assembly is avoided, which could potentially otherwise cause the outer bearing to be damaged and/or make the wrench difficult to remove from the nut.

As depicted in FIGS. 5-6, top member 225 may be connected to engaging member 210 which may be connected to spacer 218 which may be connected to engaging member 215. An arm 250 may be connected to top member 225, engaging member 210, and engaging member 215 on an opposite side of wrench 5 relative to spacer 218. Alternatively, arm 250 could be connected to top member 225 while engaging member 210 may be connected to engaging member 215 by a second spacer similar or identical to spacer 218.

Arm 250 extends upwardly from top member 225 such that a longitudinal dimension thereof extends in a direction parallel to an axis of inner circumferential surface 221 and engaging surfaces 214 and 216. When wrench 5 is received in annular space 226 the longitudinal dimension of arm 250 may extend outwardly away from the bearing assembly and parallel to the axis of shaft 14. Arm 250 may extend axially past a flange 227 (e.g., an extended tubular mounting flange for planetary drive gears) of the bearing assembly as depicted in FIGS. 1-4. Arm 250 may also include a drive connecting portion 260 having an aperture 270 configured (e.g., shaped and dimensioned) to receive a standard (e.g., ¾") square wrench drive 280. As described above, arm 250 may extend through one of openings 52 such that a user may manipulate drive 280 to control wrench 5 such that an endplay of the bearing assembly may be adjusted by rotating nut 11 clockwise or counterclockwise.

Wrench 5 may be made of two plates where an outer plate (e.g., top member 225) is counterbored to provide a stopping surface (e.g., stopping surface 220) to avoid the wrench from being inserted too far into a cavity (e.g., cavity 226) around a nut (e.g., nut 11) of a bearing assembly. Alternatively, wrench 5 may be made by laminating two laser cut plates instead of the machining described above. In this case, all of wrench 5 could be made of laser cut parts welded together. Further the wrench described above could be formed in any manner (e.g., molding, machining, etc) and of any material which permits a retaining nut (e.g., nut 11) to be manipulated by a user by receiving the wrench in a cavity of a bearing assembly around the nut and allows engaging surfaces (e.g., engaging surfaces 214, 216) to engage nut flat surfaces of the nut to turn the nut to adjust endplay of the bearing assembly.

The wrench (i.e., wrench 5) could further be formed in any shape which allows the wrench to extend into a cavity (e.g., cavity 226) around a retaining nut (e.g., nut 11) and engage the nut to allow it to be manipulated to adjust the endplay of the bearing assembly. Further, the wrench could connect to a drive (e.g., drive 280) to allow the nut to be more easily turned or the wrench could be utilized by itself to manipulate the nut. Also, the wrench could formed of any material which could be formed or machined into the shape desired and which is rigid enough to allow it to be utilized to transfer a force to the nut to turn the nut to adjust the endplay.

As depicted, system 10 is attached to wheel hub 12 so that system 10 may be rotated (e.g., by a user manipulating handle 40) if needed to permit additional angular turning of nut 11 during adjustment. Also, wrench 5 may be placed on nut 11 before or after attachment of cap onto end 13 of shaft 14, but wrench 5 must be inserted into cavity 226 around nut 11 before mounting connecting, legs 45 to wheel hub 12 since wrench 5 could not be placed around end 13 of shaft 14 onto nut 11 after the legs are connected to the wheel hub. In particular, wrench 5 could not be placed around a cap connected to end 13 after frame 30 is located adjacent the cap and shaft 14 due to the engagement between the cap and probe 90 as depicted in FIGS. 1-4 and those in co-owned application Ser. No. 12/951,727 (0545.070).

Figure 2:
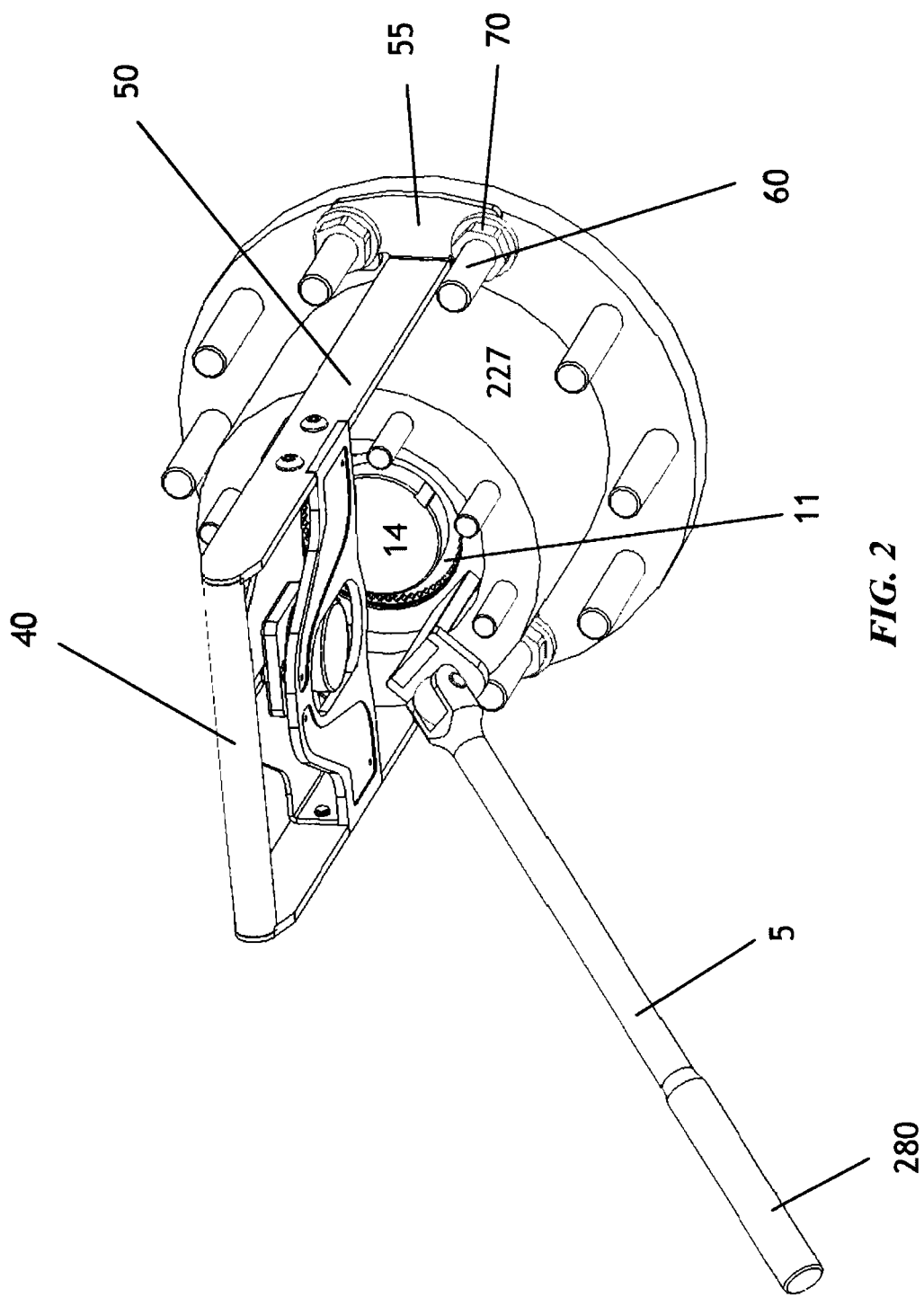
FIG. 2 is another perspective view of the system of claim 1.
Figure 3:
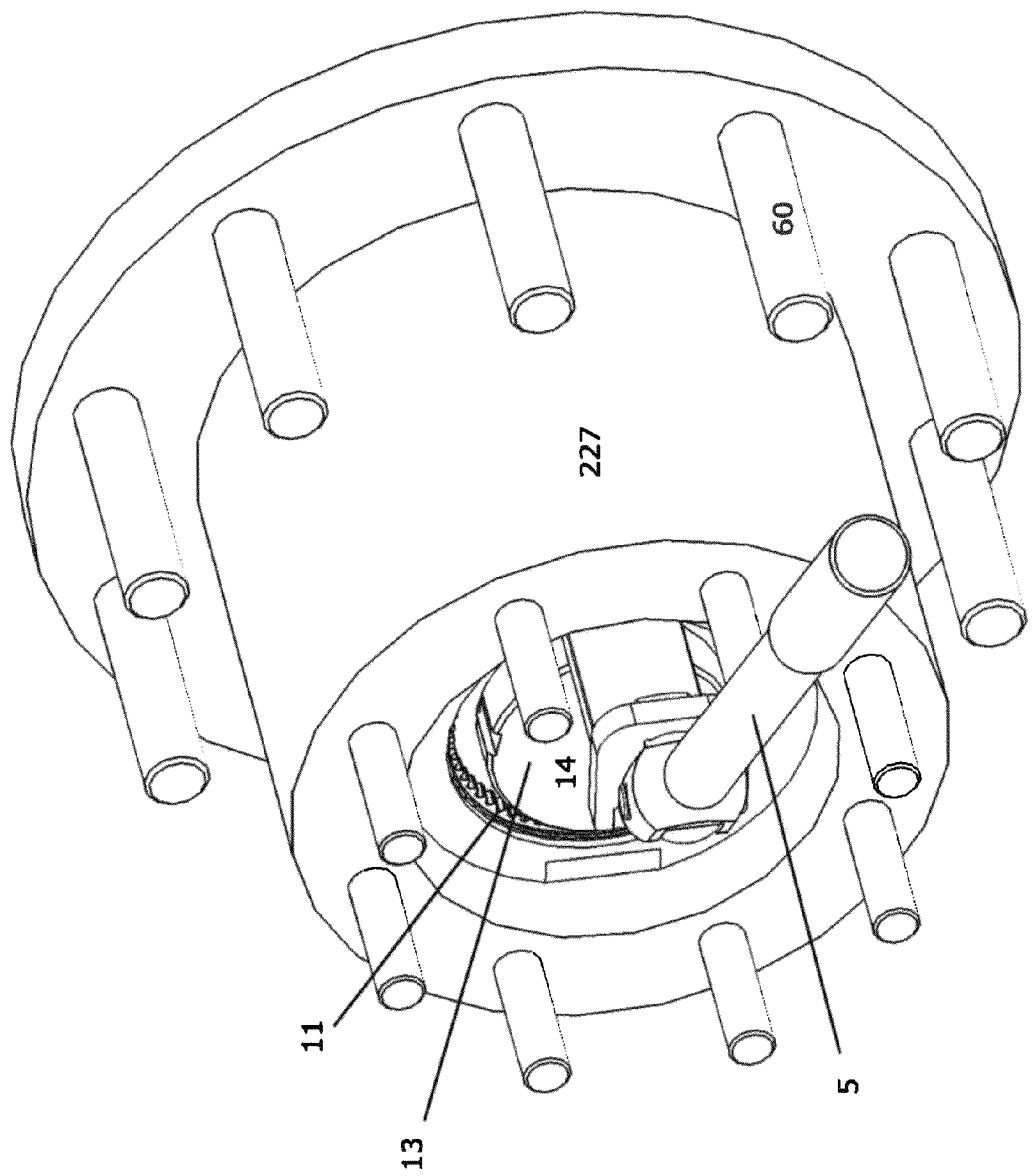
FIG. 3 is a perspective view of the system of claim 1 with the endplay measuring device thereof removed.

As described and depicted in FIGS. 1-3, endplay may be measured by system 10 with tabs 55 placed on wheel hub 12 and held in place by wheel lugs 60. In another unillustrated example, tabs 55 could be received on top a wheel (not shown) connected to hub 12. Tabs 55 may be connected to the wheel (not shown) by top lugs (not shown) holding tabs 55 on top of lug nuts 70.

As described above, handle 40 may be grasped by a user and a force may be applied thereto to move bearing 16 and hub 12 to a first position followed by a "zeroing" of the probe and then movement to a second position. During the application of force to the first position and from the first position to the second position, handle 40 may be utilized to rotate system 10 and thus hub 12 and bearing 16. This rotation insures roller alignment of the bearing such that the measured endplay is accurate for the circumference of hub 12 and bearing 16. Also, pressing legs 55 are located on opposite sides of system 10 and are located about 180° apart relative to the axis of shaft 14. The positioning of such pressing legs substantially equally distant from one another and connected to handle 40 via connecting legs 45 promotes an equidistant application of force to hub 12 and bearing 16 when a force is applied to handle 40 described above such that twisting of the hub is minimized and an accurate measurement of endplay may be achieved and an off-center loading of the bearing may be avoided. Handle 40 may also extend substantially perpendicularly relative to the axis of shaft 14 and may extend through the axis to opposite sides of such axis as depicted in the figures. In particular, handle 40 may connect to connecting legs 45, and connecting legs 45 may extend substantially parallel to the axis of shaft 45 and pressing legs 50 may also extend substantially parallel to the axis of shaft 45 such that connecting legs 50 may contact hub 12. As described above, pressing legs 50 may connect to tabs 55 which extend substantially perpendicularly to pressing legs 50. It will be understood by one skilled in the art that pressing legs 50 could connect to hub 12 in any number of other ways while satisfying the objectives of the invention.

Although aspects of the present invention were described above with respect to their application to wheel hub assemblies, for example, truck wheel hub assemblies, it is understood that aspects of the present invention may be applied to any vehicle, machine, or component having at least one bearing.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

The invention claimed is:

1. A system for use in adjusting an endplay of a bearing of a wheel hub assembly, the system comprising:
   an endplay measuring tool comprising a plurality of legs connected to a hub of the hub assembly mounted on a shaft;
   an adjustment tool received in an annular space bounded by an inner surface of a wheel hub and around a nut attached to the shaft of the wheel hub assembly, and the nut retaining the bearing on the shaft, the inner surface extending in a direction away from the hub and toward said endplay measuring tool further than said nut extends in the direction;
   said tool having an engaging surface releasably engaging the nut;
   said tool having a stopping surface releasably abutting an outer surface of the nut opposite the bearing such that said engaging surface is positioned in an engaging position engaging nut engaging surfaces of the nut;
   said tool having an arm extending away from the bearing and substantially parallel to an axis of the shaft, said arm extending away from said bearing through an opening between two legs of said plurality of legs such that an end of said arm opposite said bearing is accessible to a user to allow the user to turn said arm and said engaging surface to turn the nut to adjust an endplay of the bearing.

2. The system of claim 1 wherein said stopping surface extends further radially inwardly relative to the axis of the shaft than said engaging surface extends inwardly.

3. The system of claim 1 wherein said stopping surface lies within a plane substantially perpendicular to the axis of the shaft.

4. The system of claim 1 further comprising a cavity between said stopping surface and said engaging surface such that said stopping surface is axially spaced from said engaging surface relative to the axis of the shaft.

5. The system of claim 1 wherein said engaging surface comprises a first plate, and further comprising a second plate, said second plate comprising said stopping surface and a second engaging surface configured to engage the nut.

6. The system of claim 1 wherein said engaging surface comprises a wrench surface configured to engage flat surfaces of the nut.

7. The system of claim 1 wherein said stopping surface is located relative to said engaging surface to avoid contact of said engaging surface with the bearing when said stopping surface abuts the nut.

8. The system of claim 1 wherein said connecting portion comprises an aperture configured to receive an extending portion of the drive to connect said connecting portion to the drive.

9. The system of claim 1 wherein said arm has a length in an axial direction relative to the axis of the shaft such that a connector of said arm is located beyond an extended tubular mounting flange of the shaft and beyond lugs attached to the flange.

10. The system of claim 1 wherein said arm comprises a drive connecting portion at an end of said arm opposite said stopping surface, said drive connecting portion configured to connect to a drive to allow a user to manipulate said arm and said engaging surface to turn the nut to adjust an endplay of the bearing.

11. The system of claim 1 wherein said endplay measuring tool avoids contacting said nut.

12. The system of claim 1 wherein said endplay measuring tool is unconnected relative to the shaft.

13. A method for use in adjusting an endplay of a bearing of a wheel hub assembly, the method comprising:
   connecting a plurality of legs of an endplay measuring tool to a hub of the hub assembly mounted on a shaft;
   receiving an adjustment tool in an annular space around a nut attached to the shaft of the wheel hub assembly and retaining the bearing on the shaft, the annular space bounded by an inner surface of the hub and the nut, the inner surface extending in a direction away from the hub and toward the endplay measuring tool further than the nut extends in the direction;
   the tool having an engaging surface releasably engaging the nut;
   the tool having a stopping surface releasably abutting an outer surface of the nut opposite the bearing such that the engaging surface is positioned in an engaging position engaging nut engaging surfaces of the nut;
   the tool having an arm extending away from the bearing and substantially parallel to an axis of the shaft, the arm extending away from the bearing such that an end of the arm opposite the bearing is accessible to a user to allow the user to turn the arm and the engaging surface to turn the nut to adjust an endplay of the bearing; and
   manipulating the tool through an opening between two legs of the plurality of legs to adjust the endplay.

14. The method of claim 13 wherein the arm has a length in an axial direction relative to the axis of the shaft such that a connector of the arm is located beyond an extended tubular mounting flange of the shaft and beyond lugs attached to the flange.

15. The system of claim 13 wherein said endplay measuring tool is unconnected relative to the shaft.

16. The system of claim 13 wherein said endplay measuring tool avoids contacting said nut.

\* \* \* \* \*